United States Patent
Southerland et al.

(10) Patent No.: US 7,904,750 B2
(45) Date of Patent: Mar. 8, 2011

(54) SECTOR-ORIENTED HARDWARE DEFECT COMPRESSION BASED ON FORMAT INFORMATION

(75) Inventors: Bobby Ray Southerland, Longmont, CO (US); John P. Mead, Longmont, CO (US)

(73) Assignee: Broadcom Corporation, Irvine, CA (US)

( * ) Notice: Subject to any disclaimer, the term of this patent is extended or adjusted under 35 U.S.C. 154(b) by 512 days.

(21) Appl. No.: 11/426,752

(22) Filed: Jun. 27, 2006

(65) Prior Publication Data

US 2008/0010509 A1   Jan. 10, 2008

Related U.S. Application Data

(60) Provisional application No. 60/785,751, filed on Mar. 24, 2006.

(51) Int. Cl.
  *G06F 11/00*  (2006.01)
(52) U.S. Cl. ............................................................ 714/8
(58) Field of Classification Search ........................ 714/8
  See application file for complete search history.

(56) References Cited

U.S. PATENT DOCUMENTS

| | | | | |
|---|---|---|---|---|
| 5,325,370 A | * | 6/1994 | Cleveland et al. | 714/755 |
| 5,384,786 A | * | 1/1995 | Dudley et al. | 714/784 |
| 5,422,890 A | * | 6/1995 | Klingsporn et al. | 714/723 |
| 5,537,537 A | * | 7/1996 | Fujikawa et al. | 714/30 |
| 5,563,746 A | * | 10/1996 | Bliss | 360/53 |
| 6,167,461 A | * | 12/2000 | Keats et al. | 710/5 |
| 6,275,346 B1 | * | 8/2001 | Kim et al. | 360/31 |
| 6,332,207 B1 | * | 12/2001 | Southerland et al. | 714/763 |
| 6,463,552 B1 | * | 10/2002 | Jibbe | 714/33 |
| 7,167,330 B2 | * | 1/2007 | Elliott et al. | 360/66 |
| 2001/0052093 A1 | * | 12/2001 | Oshima et al. | 714/719 |
| 2002/0035704 A1 | * | 3/2002 | Wilson | 714/6 |
| 2007/0136628 A1 | * | 6/2007 | Doi et al. | 714/718 |

OTHER PUBLICATIONS

TDB-ACC-No. NN7407495, Disclosure Title: Disc File Defect Screening System. Jul. 1974. Publication-Data: IBM Technical Disclosure Bulletin, Jul. 1974, US, vol. No. 17, Issue No. 2, p. 495-497.*

* cited by examiner

*Primary Examiner* — Scott T Baderman
*Assistant Examiner* — Yair Leibovich
(74) *Attorney, Agent, or Firm* — Garlick Harrison & Markison; Holly L. Rudnick

(57) ABSTRACT

A system and method identifies and masks physical sectors where the errors encountered during the defect scan exceed a predetermined level. This avoids the need to read and process all the data written to an individual sector during the initial defect scan. This method first writes a predetermined pattern such as a 2-T pattern to the magnetic media available for user data. This written pattern is then read. As the pattern is read, an error result increments or decrements a counter based on the error. The counter reaching a predetermined level signifies that there are too many errors in this physical sector. This sector may then be added to the primary defect list and masked out without reading the remaining written pattern within the sector. This will result significant time savings as physical sectors containing multiple errors are identified without process all the information written to the physical sector. The primary defect list is used during the low-level format to map logical locations to physical locations.

24 Claims, 13 Drawing Sheets

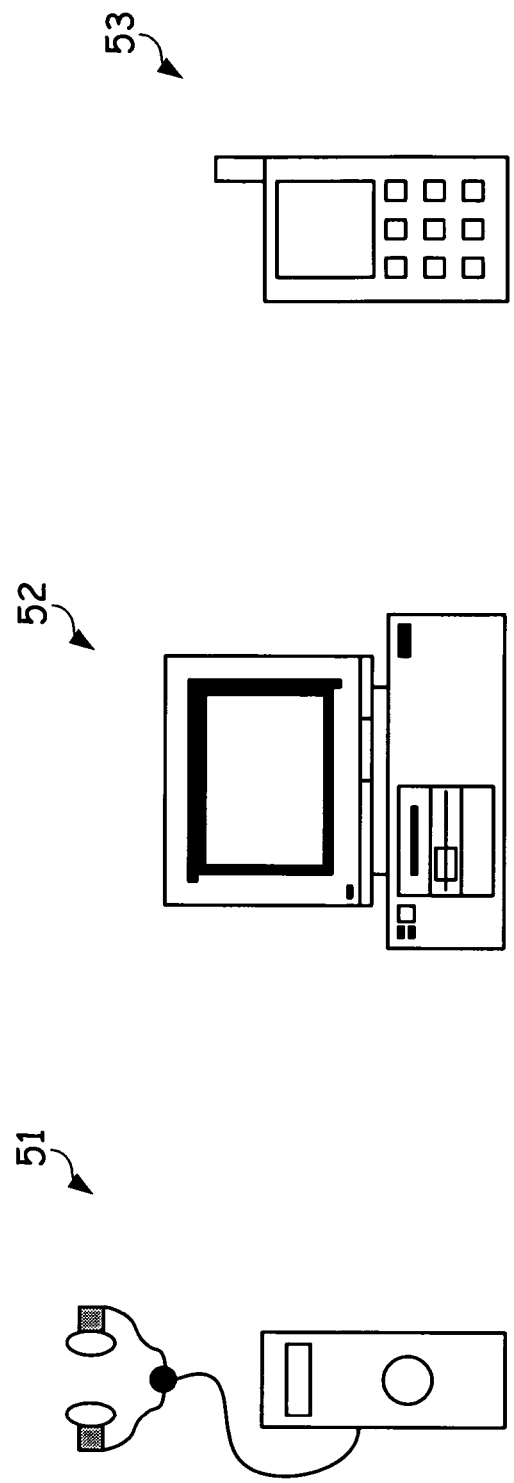
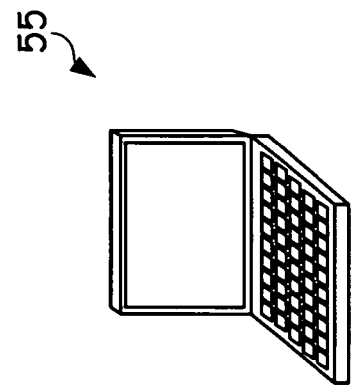
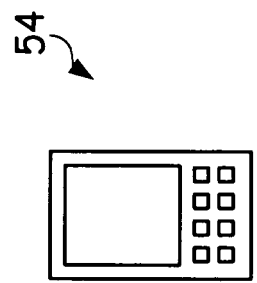
FIG. 4A
FIG. 4B
FIG. 4C
FIG. 4D
FIG. 4E

| DSCAN_CTRL | |
|---|---|
| VALUE | OP-CODE |
| 000 | NOP |
| 001 | DXFR |
| 010 | CRIT |
| 011 | SERR |
| 100 | RSVD |
| 101 | RSVD |
| 110 | RSVD |
| 111 | RSVD |

FIG. 12

SECTOR-ORIENTED HARDWARE DEFECT COMPRESSION BASED ON FORMAT INFORMATION

CROSS-REFERENCE TO RELATED APPLICATIONS

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:

1. U.S. Provisional Application Ser. No. 60/785,751, entitled "SECTOR-ORIENTED HARDWARE DEFECT COMPRESSION BASED ON FORMAT INFORMATION," filed Mar. 24, 2006.

TECHNICAL FIELD OF THE INVENTION

Embodiments of the present invention relate generally to memory storage devices; and, more particularly, embodiments of the present invention relate to defect scans of memory storage devices.

BACKGROUND OF THE INVENTION

As is known, many varieties of memory storage devices (e.g. disk drives), such as magnetic disk drives are used to provide data storage for a host device, either directly, or through a network such as a storage area network (SAN) or network attached storage (NAS). Typical host devices include stand alone computer systems such as a desktop or laptop computer, enterprise storage devices such as servers, storage arrays such as a redundant array of independent disks (RAID) arrays, storage routers, storage switches and storage directors, and other consumer devices such as video game systems and digital video recorders. These devices provide high storage capacity in a cost effective manner.

The structure and operation of hard disk drives is generally known. Hard disk drives include, generally, a case, a hard disk having magnetically alterable properties, and a read/write mechanism including Read/Write (RW) heads operable to write data to the hard disk by locally alerting the magnetic properties of the hard disk and to read data from the hard disk by reading local magnetic properties of the hard disk. The hard disk may include multiple platters, each platter being a planar disk.

All information stored on the hard disk is recorded in tracks, which are concentric circles organized on the surface of the platters. FIG. 1 depicts a pattern of radially-spaced concentric data tracks 12 within a disk 10. Data stored on the disks may be accessed by moving RW heads radially as driven by a head actuator to the radial location of the track containing the data. To efficiently and quickly access this data, fine control of RW hard positioning is required. The track-based organization of data on the hard disk(s) allows for easy access to any part of the disk which is why hard disk drives are called "random access" storage devices.

Since each track typically holds many thousands of bytes of data, the tracks are further divided into smaller units called sectors. This reduces the amount of space wasted by small files. Each sector holds 512 bytes of user data, plus as many as a few dozen additional bytes used for internal drive control and for error detection and correction.

Typically, these tracks and sectors are created during the low level formatting of the disk. This low level formatting process creates the physical structures (tracks, sectors, control information) on the disk. Normally, this step begins with the hard disk platters containing no information. Newer disks use many complex internal structures, including zoned bit recording to put more sectors on the outer tracks than the inner ones, and embedded servo data to control the head actuator. Newer disks also transparently map out bad sectors. Due to this complexity all modern hard disks are low-level formatted at the factory for the life of the drive.

Prior to performing this low-level format a defect scan must be performed at the factory on the physical media in order to determine what media will not properly store data. Failure to do a proper media defect scan would result in the potential loss of user data. In order to map out physical defects within the magnetic media a defect scan such as a 2-T defect scan can be performed to identify such errors. This defect scan typically involves writing a predetermined data pattern to the magnetic media. All the written data is then read and processed to determine the presence of physical defects in the magnetic media. Sectors having physical defects may then be masked out to prevent writing data to these areas. Such process results in time-consuming defect scan that reduces productivity.

SUMMARY OF THE INVENTION

Embodiments of the present invention are directed to systems and methods that are further described in the following description and claims. Advantages and features of embodiments of the present invention may become apparent from the description, accompanying drawings and claims.

Further limitations and disadvantages of conventional and traditional defect scan processes and related functionality will become apparent to one of ordinary skill in the art through comparison with the present invention described herein.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIG. 4A illustrates an embodiment of a handheld audio unit that utilizes a hard disk drive in accordance with an embodiment of the present invention;

FIG. 4B illustrates an embodiment of a computer that utilizes a hard disk drive in accordance with an embodiment of the present invention;

FIG. 4C illustrates an embodiment of a wireless communication device that utilizes a hard disk drive in accordance with an embodiment of the present invention;

FIG. 4D illustrates an embodiment of a personal digital assistant (PDA) that utilizes a hard disk drive in accordance with an embodiment of the present invention;

FIG. 4E illustrates an embodiment of a laptop computer that utilizes a hard disk drive in accordance with an embodiment of the present invention;

FIG. 12 provides a table of potential modes of operation of the defect scan.

DETAILED DESCRIPTION OF THE INVENTION

Embodiments of the present invention are illustrated in the Figures, like numerals being used to refer to like and corresponding parts of the various drawings.

Embodiments of the present invention provide a system and method which may identify and mask physical sectors where the errors encountered during the defect scan exceed a predetermined level. This avoids the need to read and process all the data written to an individual sector. This method of identifying physical defects within the physical media first writes a predetermined pattern such as a 2-T pattern to the magnetic media available for user data. This written pattern is then read from the magnetic media. As the written pattern is read, when an error results a counter is adjusted (incremented or decremented) based on the error. When the counter reaches a predetermined level or threshold, this may signify that there are too many errors within a given physical sector. This physical sector may be added to the primary defect list and masked out without reading the remaining written pattern within the sector. This will result significant time savings as physical sectors containing multiple errors are identified without processing all the information written to the physical sector. The primary defect list is then used during the low-level format to map logical locations to physical locations.

Figure 1:
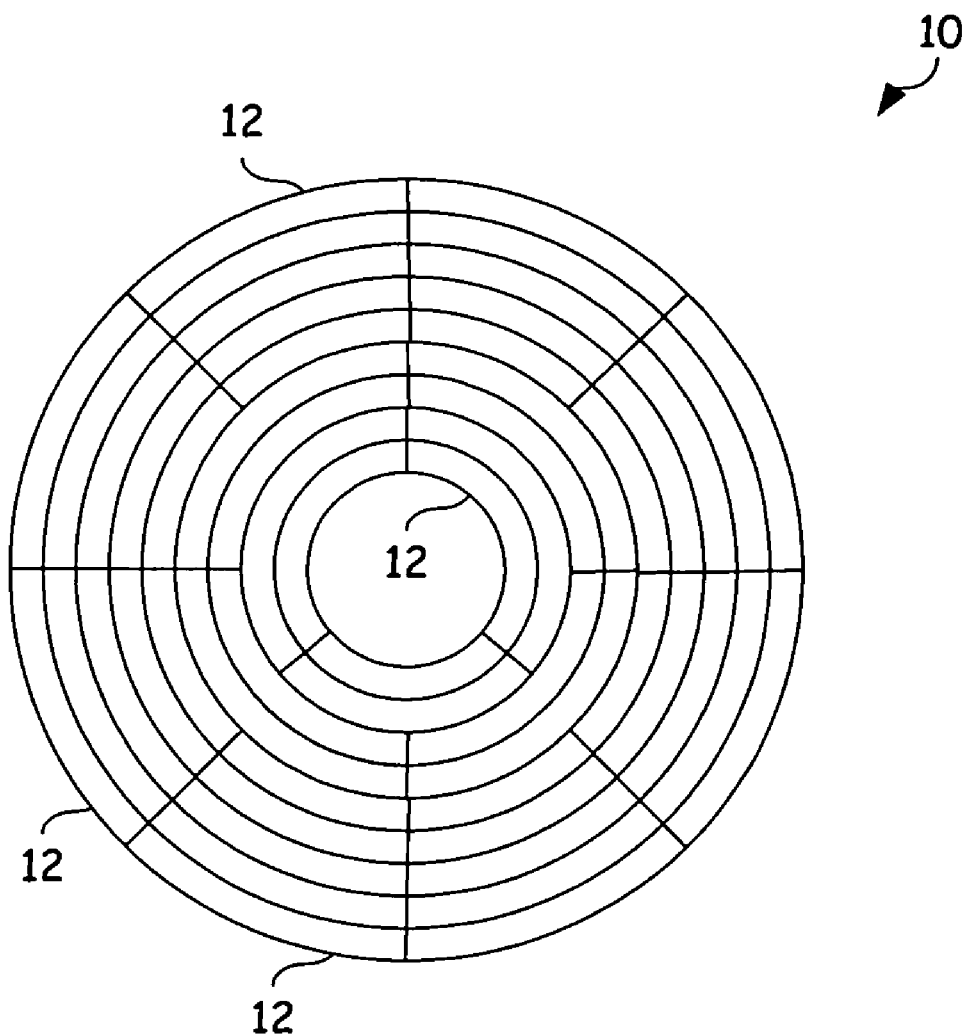
FIG. 1 depicts a prior art pattern of radially-spaced concentric data tracks within the magnetic media of a disk.
Figure 2:
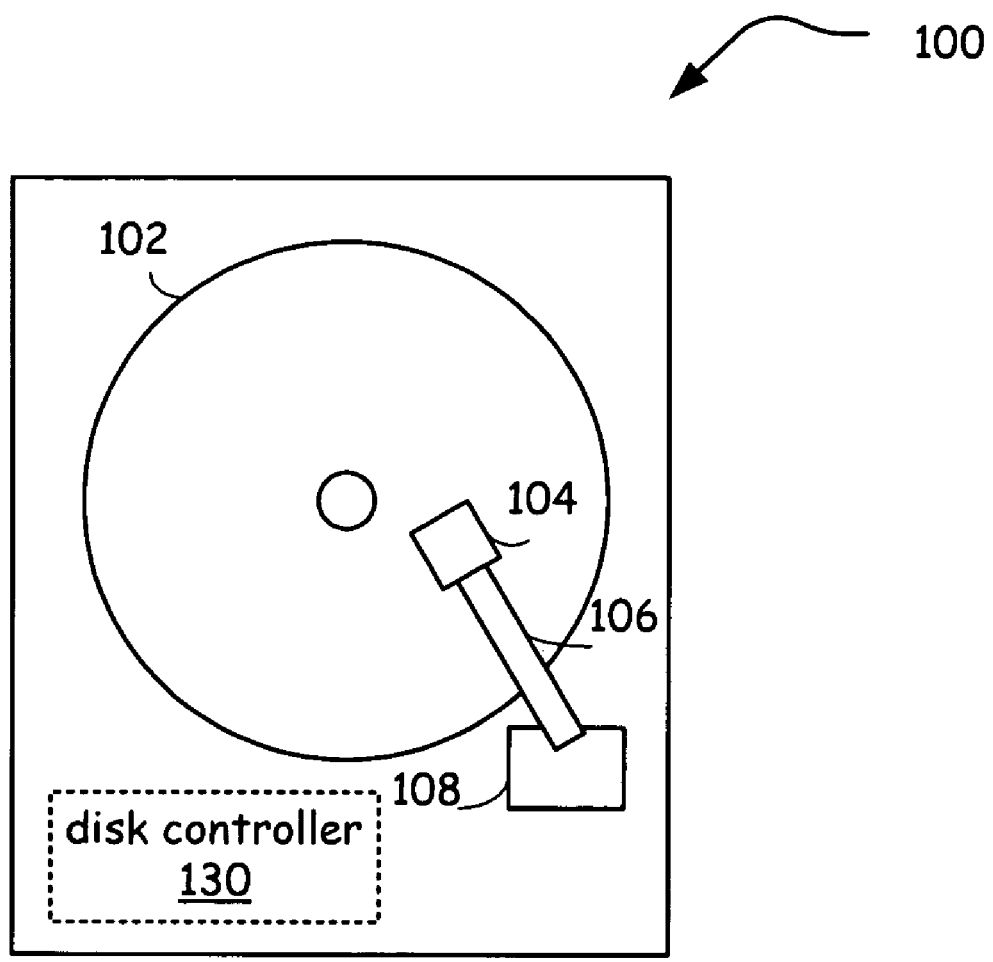
FIG. 2 depicts an embodiment of a disk drive unit.

FIG. 2 illustrates an embodiment of a disk drive unit 100. In particular, disk drive unit 100 includes a disk 102 that is rotated by a servo motor (not specifically shown) at a velocity such as 3600 revolutions per minute (RPM), 4200 RPM, 4800 RPM, 5,400 RPM, 7,200 RPM, 10,000 RPM, 15,000 RPM, however, other velocities including greater or lesser velocities may likewise be used, depending on the particular application and implementation in a host device. In one possible embodiment, disk 102 can be a magnetic disk that stores information as magnetic field changes on some type of magnetic medium. The medium can be a rigid or non-rigid, removable or non-removable, that consists of or is coated with magnetic material.

Disk drive unit 100 further includes one or more read write heads 104 that are coupled to arm 106 that is moved by actuator 108 over the surface of the disk 102 either by translation, rotation or both. A disk controller 130 is included for controlling the read and write operations to and from the drive, for controlling the speed of the servo motor and the motion of actuator 108, and for providing an interface to and from the host device. Additionally, this disk controller may manage the defect scans to be performed in accordance with embodiments of the present invention.

Figure 3:
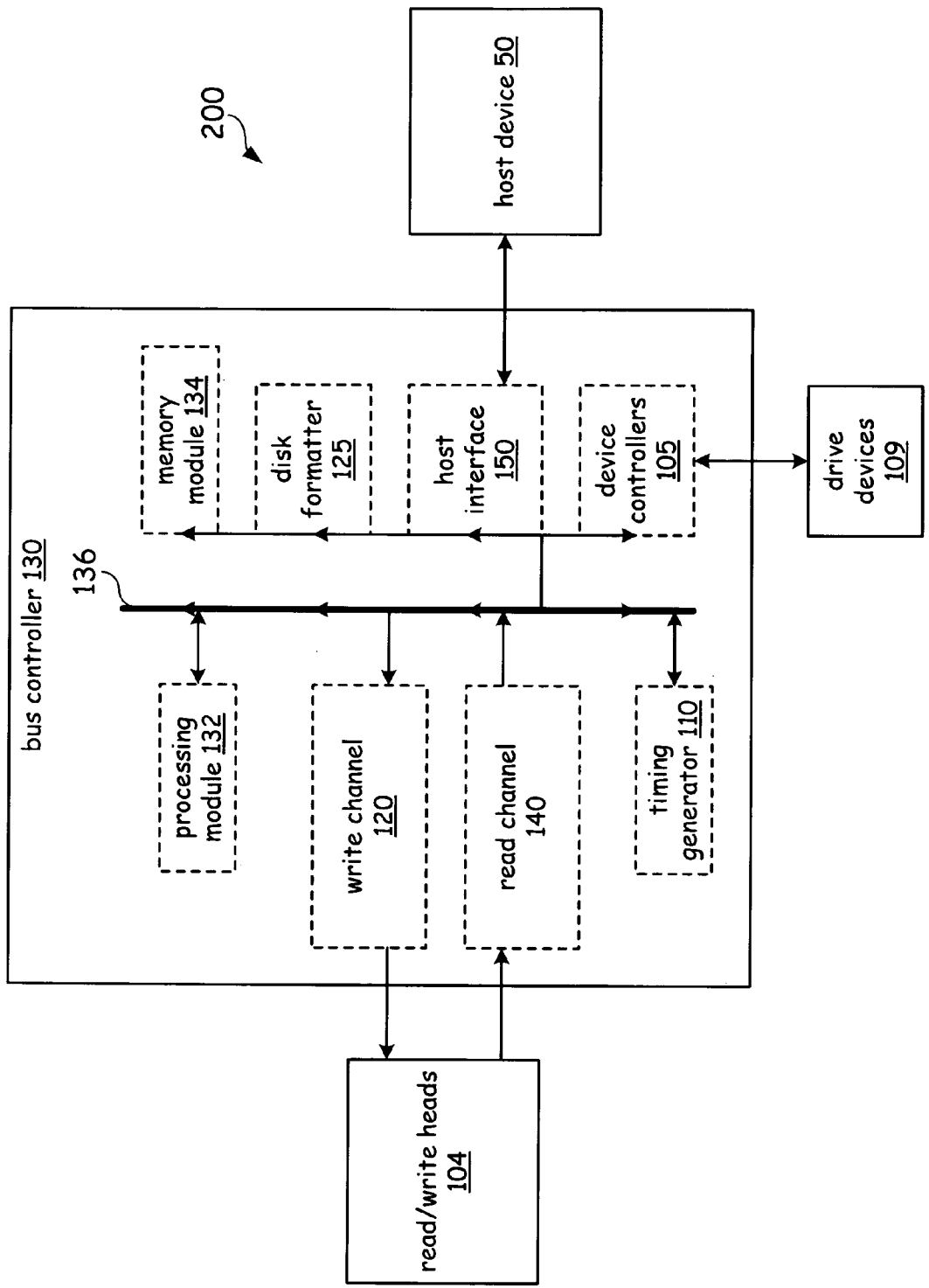
FIG. 3 depicts an embodiment of a disk controller.

FIG. 3 illustrates an embodiment of a disk controller 130. Disk controller 130 includes a read channel 140 and write channel 120 for reading and writing data to and from disk 102 through read/write heads 104. Disk formatter 125 is included for controlling the formatting of disk drive unit 100, timing generator 110 provides clock signals and other timing signals, device controllers 105 control the operation of drive devices 109 such as actuator 108 and the servo motor, etc. Host interface 150 receives read and write commands from host device 50 and transmits data read from disk 102 along with other control information in accordance with a host interface protocol. In one possible embodiment, the host interface protocol can include, SCSI, SATA, enhanced integrated drive electronics (EIDE), or any number of other host interface protocols, either open or proprietary, that can be used for this purpose.

Disk controller 130 further includes a processing module 132 and memory module 134. Processing module 132 can be implemented using one or more microprocessors, microcontrollers, digital signal processors (DSPs), microcomputers, central processing units (CPUs), field programmable gate arrays (FPGAs), programmable logic devices (PLAs), state machines, logic circuits, analog circuits, digital circuits, and or any devices that manipulates signal (analog and/or digital) based on operational instructions that are stored in memory module 134. When processing module 132 is implemented with two or more devices, each device can perform the same steps, processes or functions in order to provide fault tolerance or redundancy. Alternatively, the function, steps and processes performed by processing module 132 can be split between different devices to provide greater computational speed and or efficiency.

Memory module 134 may be a single memory device or a plurality of memory devices. Such a memory device may be a read-only memory (ROM), random access memory (RAM), volatile memory, non-volatile memory, static random access memory (SRAM), dynamic random access memory (DRAM), flash memory, cache memory, and/or any device that stores digital information. Note that when the processing module 132 implements one or more of its functions via a state machine, analog circuitry, digital circuitry, and/or logic circuitry, the memory module 134 storing the corresponding operational instructions may be embedded within, or external to, the circuitry comprising the state machine, analog circuitry, digital circuitry, and/or logic circuitry. Further note that, the memory module 134 stores, and the processing module 132 executes, operational instructions that can correspond to one or more of the steps or a process, method and/or function illustrated herein.

Disk controller 130 includes a plurality of modules, in particular, device controllers 105, processing timing generator 110, processing module 132, memory module 134, write channel 120, read channel 140, disk formatter 125, and host interface 150 that are interconnected via bus 136. Each of these modules can be implemented in hardware, firmware, software or a combination thereof, in accordance with the broad scope of the present invention. While the particular bus architecture is shown in FIG. 2 with a single bus 136, alternative bus architectures that include additional data buses, further connectivity, such as direct connectivity between the various modules, are likewise possible to implement additional features and functions.

In one possible embodiment, one or more modules of disk controller 130 are implemented as part of a system on a chip (SOC) integrated circuit. In such a possible embodiment, this SOC integrated circuit includes a digital portion that can include additional modules such as protocol converters, linear block code encoding and decoding modules, etc., and an analog portion that includes device controllers 105 and optionally additional modules, such as a power supply, etc. In an alternative embodiment, the various functions and features of disk controller 130 are implemented in a plurality of integrated circuit devices that communicate and combine to perform the functionality of disk controller 130.

FIG. 4A illustrates an embodiment of a handheld audio unit 51. In particular, disk drive unit 100 can be implemented in the handheld audio unit 51. In one possible embodiment, the disk drive unit 100 can include a small form factor magnetic hard disk whose disk 102 has a diameter 1.8" or smaller that is incorporated into or otherwise used by handheld audio unit 51 to provide general storage or storage of audio content such as motion picture expert group (MPEG) audio layer 3 (MP3) files or Windows Media Architecture (WMA) files, video content such as MPEG4 files for playback to a user, and or any other type of information that may be stored in a digital format.

FIG. 4B illustrates an embodiment of a computer 52. In particular, disk drive unit 100 can be implemented in the computer 52. In one possible embodiment, disk drive unit 100 can include a small form factor magnetic hard disk whose disk 102 has a diameter 1.8" or smaller, a 2.5" or 3.5" drive or larger drive for applications such as enterprise storage applications. Disk drive 100 is incorporated into or otherwise used by computer 52 to provide general purpose storage for any type of information in digital format. Computer 52 can be a desktop computer, or an enterprise storage devices such a server, of a host computer that is attached to a storage array such as a redundant array of independent disks (RAID) array, storage router, edge router, storage switch and/or storage director.

FIG. 4C illustrates an embodiment of a wireless communication device 53. In particular, disk drive unit 100 can be implemented in the wireless communication device 53. In one possible embodiment, disk drive unit 100 can include a small form factor magnetic hard disk whose disk 102 has a diameter 1.8" or smaller that is incorporated into or otherwise used by wireless communication device 53 to provide general storage or storage of audio content such as motion picture expert group (MPEG) audio layer 3 (MP3) files or Windows Media Architecture (WMA) files, video content such as MPEG4 files, JPEG joint photographic expert group) files, bitmap files and files stored in other graphics formats that may be captured by an integrated camera or downloaded to the wireless communication device 53, emails, webpage information and other information downloaded from the Internet, address book information, and/or any other type of information that may be stored in a digital format.

In a possible embodiment, wireless communication device 53 is capable of communicating via a wireless telephone network such as a cellular, personal communications service (PCS), general packet radio service (GPRS), global system for mobile communications (GSM), and integrated digital enhanced network (iDEN) or other wireless communications network capable of sending and receiving telephone calls. Further, wireless communication device 53 is capable of communicating via the Internet to access email, download content, access websites, and provide steaming audio and/or video programming. In this fashion, wireless communication device 53 can place and receive telephone calls, text messages such as emails, short message service (SMS) messages, pages and other data messages that can include attachments such as documents, audio files, video files, images and other graphics.

FIG. 4D illustrates an embodiment of a personal digital assistant (PDA) 54. In particular, disk drive unit 100 can be implemented in the personal digital assistant (PDA) 54. In one possible embodiment, disk drive unit 100 can include a small form factor magnetic hard disk whose disk 102 has a diameter 1.8" or smaller that is incorporated into or otherwise used by personal digital assistant 54 to provide general storage or storage of audio content such as motion picture expert group (MPEG) audio layer 3 (MP3) files or Windows Media Architecture (WMA) files, video content such as MPEG4 files, JPEG joint photographic expert group) files, bitmap files and files stored in other graphics formats, emails, webpage information and other information downloaded from the Internet, address book information, and/or any other type of information that may be stored in a digital format.

FIG. 4E illustrates an embodiment of a laptop computer 55. In particular, disk drive unit 100 can be implemented in the laptop computer 55. In one possible embodiment, disk drive unit 100 can include a small form factor magnetic hard disk whose disk 102 has a diameter 1.8" or smaller, or a 2.5" drive. Disk drive 100 is incorporated into or otherwise used by laptop computer 52 to provide general purpose storage for any type of information in digital format.

Figure 5:
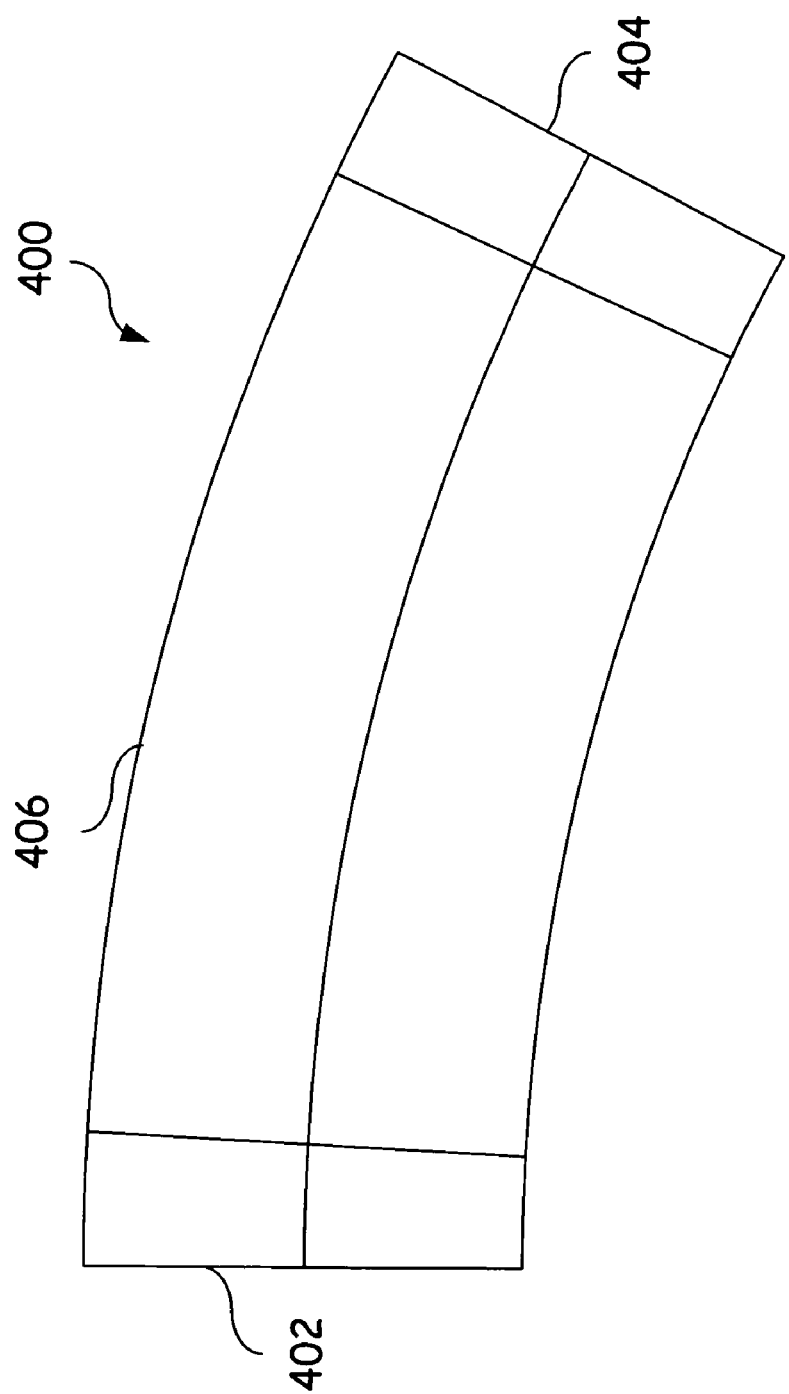
FIG. 5 depicts a portion of storage media operable to store user data between servo wedges, wherein defect scan in accordance with an embodiment of the present invention is used to identify physical defects within the storage media.

Prior to installing the HDD in a device such as the ones provided in FIG. 4A-4E, a defect scan and low level format is performed. One such scan is a 2-T defect scan. During 2T defect scan mode, when reading from the disk with the head positioned between servo wedges, the read channel provides information pertaining to the types of defects that are detected on a symbol basis. This information can be packetized for further processing The purpose of the defect scan packetizer is to compress defect scan information retrieved during 2T defect scan mode, into packets that they can be processed and used in the generation of a disk drive primary defect list. FIG. 5 shows a portion of magnetic media 400 in between servo wedges 402 and 404. Servo wedges contain information that allows the disk controller to determine which tract the rewrite head is located over. After reading the information within the servo wedges, user data is provided in region 406, which may also include redundancy bits, error correction coding and cyclical redundancy checks to ensure that data can be recovered properly from the magnetic (storage) media between servo wedges 402 and 404. During the defect scan, a predetermined pattern of ones and zeros may be written to the physical sector 406 between the servo wedges 402 and 406. After writing this data, this pattern to the magnetic media, the RW head will read the data in order to determine which individual symbols within the sector contained a defect in the physical media.

Figure 6:
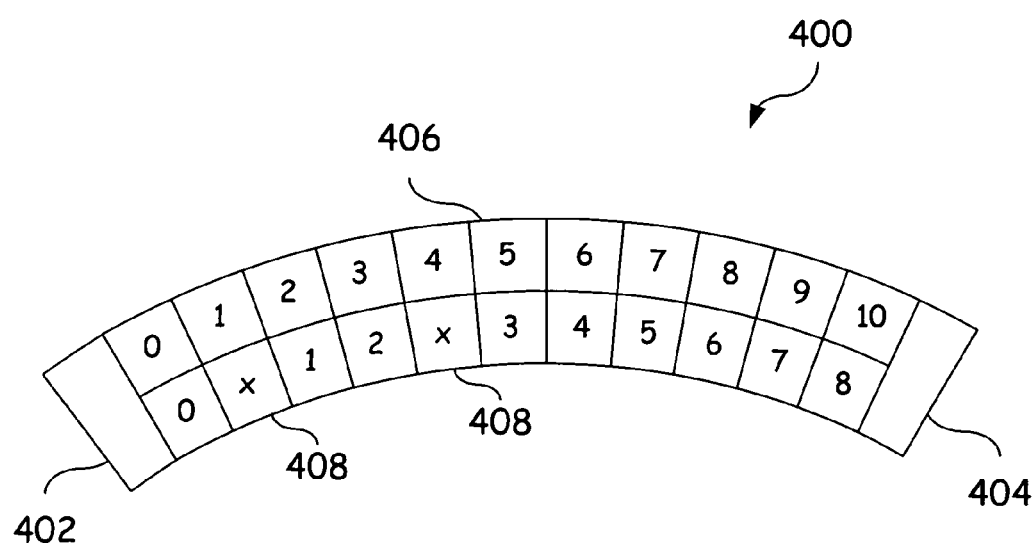
FIG. 6 depicts a portion of storage media operable to store user data between servo wedges, wherein physical block addresses have been mapped to logical addresses based on the results of a defect scan in accordance with an embodiment of the present invention is used to identity physical defects within the storage media.

Reading the pattern within the various sectors will allow the defect scan to determine which sectors should be mapped out in the low level formatting of magnetic media. As shown in FIG. 6 here, sectors have a physical address written above a logical block address. The physical address starts with sector zero and continues and is incremented upwards. The logical block address also begins zero and increments upward; however, based on the result of the defect scan, individual sectors maybe masked such as masked sectors 408 maybe masked out and made unavailable by placing these sectors in the primary defect list. The sectors to be masked out typically have some physical flaw wherein any data that may be stored in that sector will be lost. Therefore, the primary defect list is created in order mask out those sectors such that user data cannot be written to the masked out sectors.

Prior defect scans may have previously masked out the entire data span located between servo wedges 402 and 404 depending on the results of the defect scan. Embodiment of the present invention examine individual sectors and wherein fractions of sectors to be masked. Instead of processing the entire pattern written during the defect scan, individual sectors are processed in order to determine when errors exist. The numbers of errors in a given sector are individually tracked. Should the number of errors exceed a predetermined level, then further examination of that sector is not required. That sector may then be masked and the processing of subsequent sectors can begin. This saves processing time and increases the throughput of the factory floor by decreasing the time required to perform a defect scan.

Figure 7:
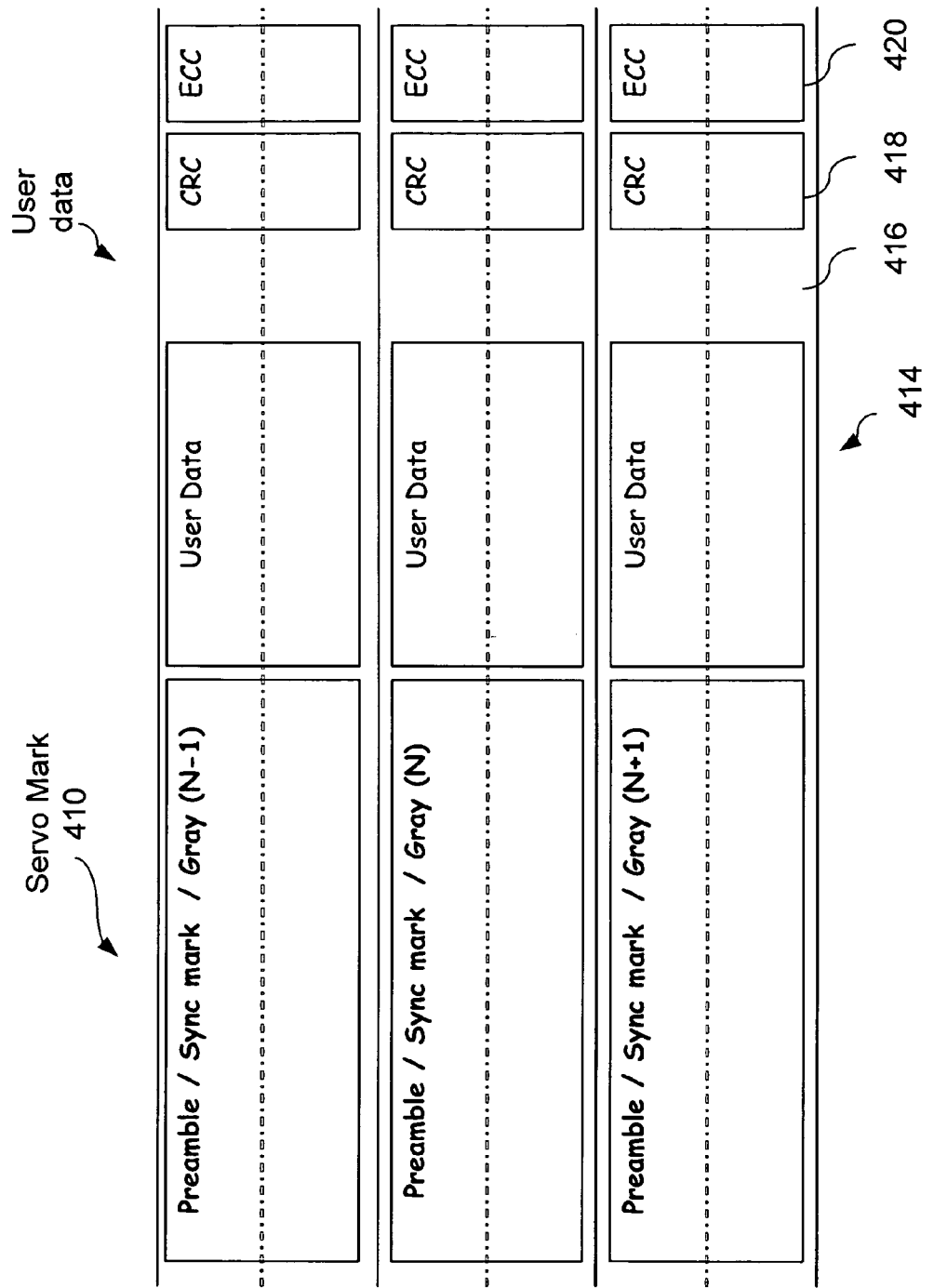
FIG. 7 depicts how information is stored within three adjacent tracks wherein physical sectors may be masked out based on the results of a defect scan in accordance with an embodiment of the present invention is used to identify physical defects within the storage media.
Figure 8:
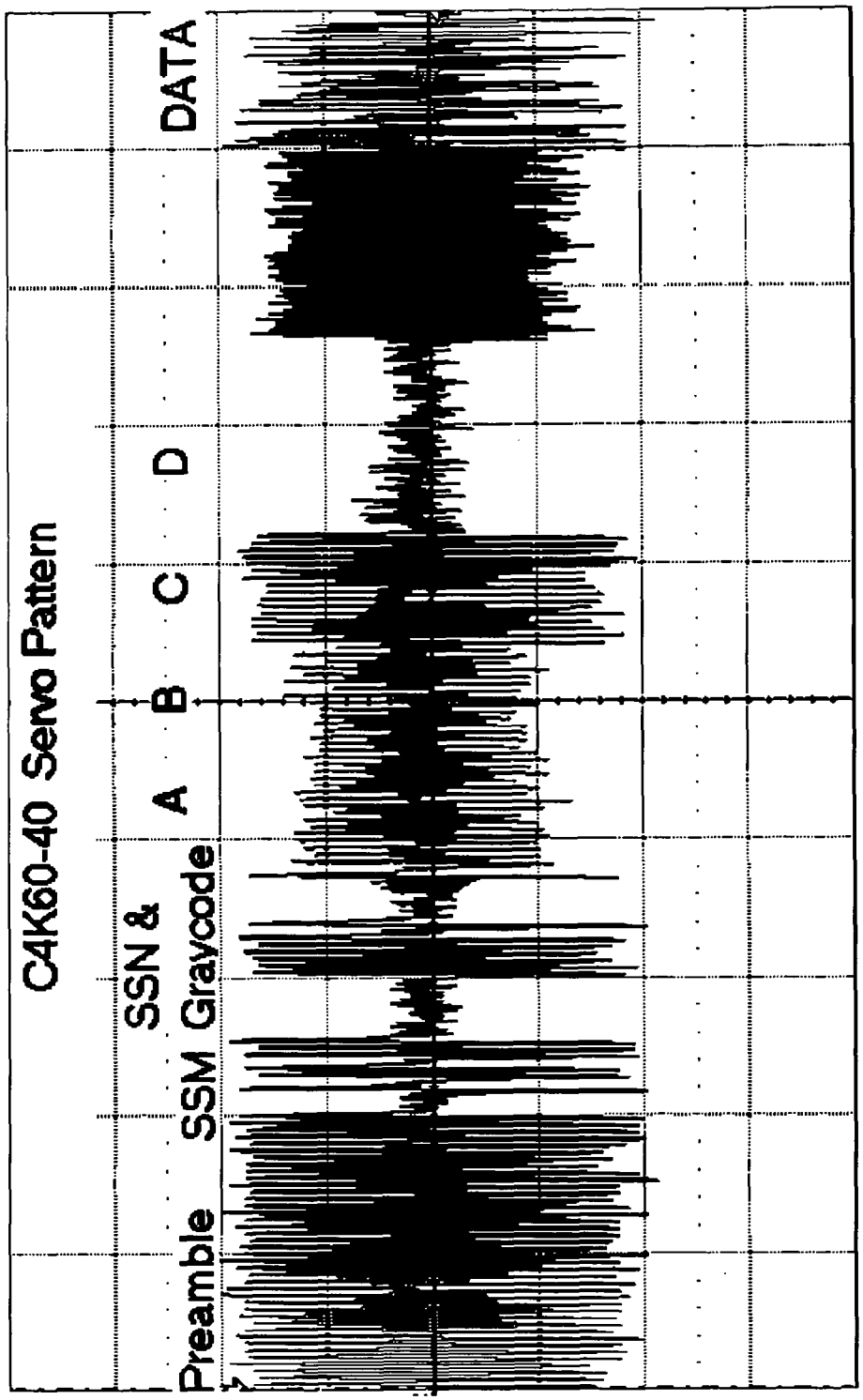
FIG. 8 depicts a signal read by the RW head as the RW head travels over a track wherein physical sectors may be masked out based on the results of a defect scan in accordance with an embodiment of the present invention is used to identify physical defects within the storage media.

FIG. 7 depicts the types of information the RW head will encounter as it passes over servo wedge 402 and data tracks 406. Within the servo wedge will be a servo mark 410 which may contain preamble, the spiral sync mark (SSM) and gray code location information. Three adjacent tracks n−1, n, and n+1, are shown. Following servo mark 410, user data may be stored in the physical media prior to reaching the next servo wedge. This may contain user data 414 as well as cyclical redundancy checks CRC bits 418 and error correction coding (ECC) bits 420. During the defect scan, the predetermined pattern is written to the user data region. FIG. 8 shows a servo signal on an individual track wherein the preamble, SSM, and gray code information are retrieved within the servo wedge prior to reaching the data portion of the track.

Format information may be used to arrive at defect scan. This results in a better method of producing data to build format without having to discard an entire wedge. Embodiments of the present invention require that one understand format information and select out fields which are treated differently. The format may be examined during the scan process.

Figure 9:
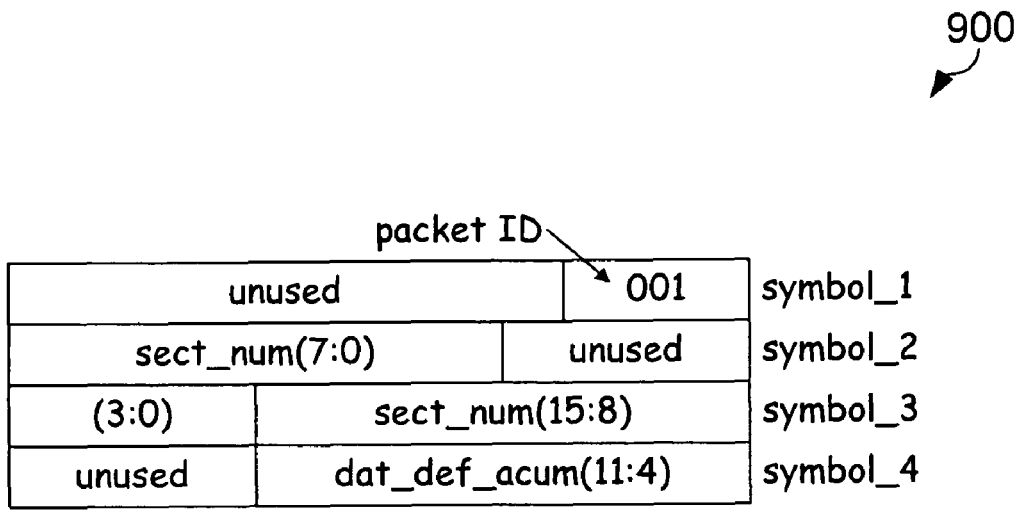
FIGS. 9A and 9B depict different descriptions of similar formats for data packets used to identify errors that result from a defect scan in accordance with an embodiment of the present invention.
Figure 9:
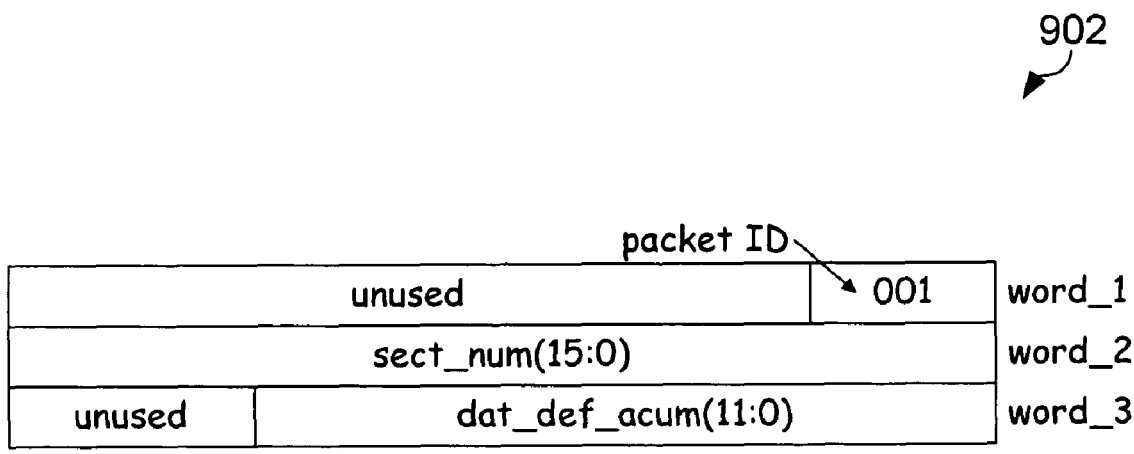
Figure 10A:
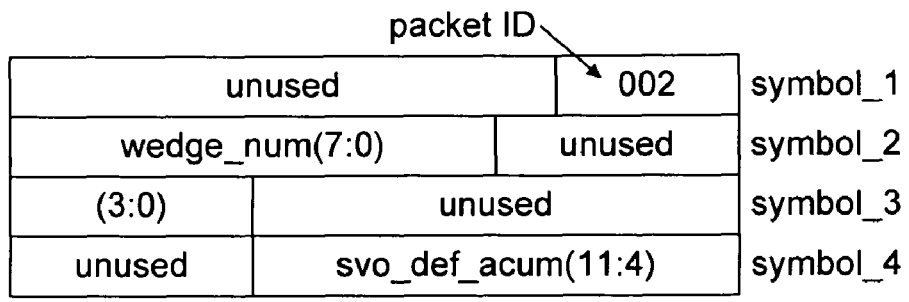
FIGS. 10A and 10B depict different descriptions of similar formats for servo packets used to identify errors that result from a defect scan in accordance with an embodiment of the present invention.
Figure 10B:
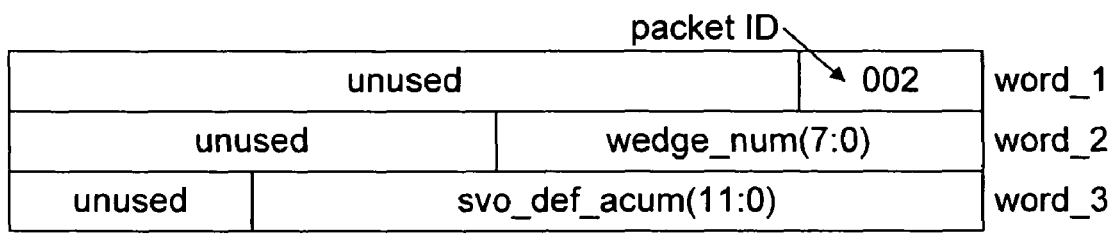

A defect scan packetizer may be used to packetize two types defect packets; namely data packets and servo packets. All packets consist of four symbols that translate into three 16-bit words. The format of all defect packets by the Disk Formatter may be defined such that the resulting packetization formats after translation into 16-bit words. Exemplary data packets are illustrated in FIGS. 9A, and 9B. Exemplary servo packets are shown in FIGS. 10A and 10B.

Data packets are distinguishable from servo packets by the packet ID field. They are generated on a per-sector (or fractional sector) basis and are generated when the number of non-masked defects exceeds the defect limit may be defined by the value stored in the df_defect_limit register or when regionally sensitive fields within the format have any non-masked defects. These packets 900 and 902 contain information about (1) the type of flaws detected during a sector (or fraction), and (2) the sector number starting with the first sector following index. FIG. 9A to the right shows the symbol-wise defect data packet format generated by a module such as a Disk Formatter in accordance with an embodiment of the present invention. Both data and servo defect packets can be transferred through the user data path directly to the buffer manager, or they can be transferred via the auxiliary data FIFO under control of the DPE. In either case, the user has the ability to access the data in (16-bit) word format. These processes may be discussed in further detail with reference to FIG. 11. FIG. 7B diagram shows the format after symbol-to-word translation has been accomplished by the hardware.

Servo defect information is reported by the channel at the end of the servo wedge. For this reason, servo defect packets are generated on a per-wedge basis, but only if non-masked servo errors are detected. These packets contain information about (1) the type of servo-related flaws that were detected during the servo wedge, and (2) the wedge number starting with index. FIG. 10A shows the symbol-wise defect servo packet format generated by the Disk Formatter. The corresponding servo defect packet format after hardware automated symbol-to-word translation is shown in FIG. 10B.

Figure 11:
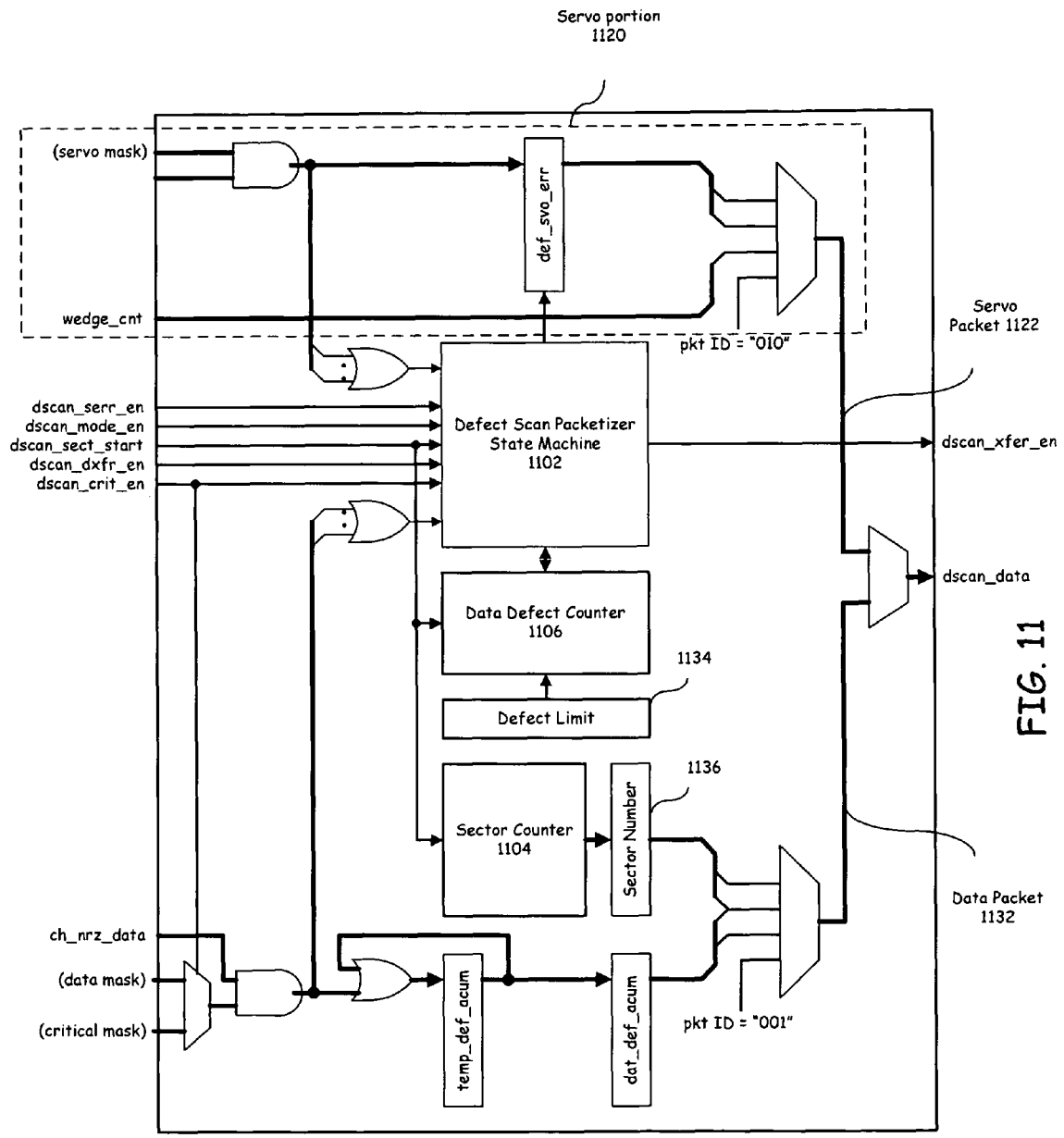
FIG. 11 depicts a block diagram of a packetizer operable to generate data packets or servo packets used to identify errors that result from a defect scan in accordance with an embodiment of the present invention.

FIG. 11 provides a block diagram of defect scan packetizer 1100 in accordance with an embodiment of the present invention. Defect scan packetizer 91100 comprises a state machine 1102 used to control the packetization process, counter 1104 used to keep track of the current sector (or fractional sector) number, counter 1106 used to detect when the number of defects per sector has exceeded the programmable limit, and some miscellaneous logic and registers to control the data path. Servo Portion 1120 is used to generate servo packet 1122. While the remaining portions of the data packetizer are used to generate data packet 1132.

Three masks are provided to allow the user to select the defect scan error conditions that will be monitored and accumulated during defect packet generation. Servo error mask 1110 is used to select servo wedge related errors from those provided by the channel on a per-wedge basis during 2T defect scan. Similarly, the data error mask 1112 is used to select data defect scan errors from the errors during 2T defect scan. For critical regions within the scannable area between servo wedges, such as the preamble and sync fields, a critical mask 1114 is provided to allow a more sensitive scan in those regions. Since defect scan is a special mode and is only used in the factory during disk drive defect processing, these masks may be provided by overloading this function onto already-existing processor-writable registers in the design which are not used for their normal intended purpose during defect scan. The servo, data, and critical data defect masks as shown are provided on df_address_mark, df_out_constant, and df_w-fault_mask, respectively. The control for the defect scan packetizer may be provided by the transfer control engine during 2T defect scan read mode. Since there is no use for the data output mux to the channel when this mode is active, defect scan (dscan_ctrl) control has been overloaded on the out_sel field of the format field element. When dscan_mode en is asserted, out_sel is assigned to ZERO and dscan_ctrl is assigned the value of the out_sel field of the current format field element. The table provided in FIG. 12 defines the available op-codes for dscan_ctrl. The NOP op-code is provided for format field elements that do not transfer data of any sort to the defect scan packetizer. This includes format field elements that perform only media-related function. In order to packetize data defects in an inter-wedge region of the disk between data sync mark detection and the negation of rd_gate, the DXFR and CRIT op-codes are provided. Both enable packetization by asserting dscan_dxfr_en. However, CRIT additionally asserts dscan_crit_en which is used to provide an alternate "critical" mask for scanning more critical regions of the disk, such as preamble and data sync mark. Any unmasked error that occurs in this critical region will cause the current sector (or fractional sector) to be considered defective.

The SERR op-code generates the dscan_serr_en which is used to latch the un-masked servo error into the def_svo_err register and notify the defect scan packetizer state machine when an unmasked servo error is detected. The usage of this op-code must be timed such that it is applied (normally for a single cycle) when servo error data is valid on the ch_servo_err bus.

The dscan_sect_end control bit is provided by the transfer control engine directly from the format field element. This control bit is used to define a new sector boundary for data defect processing and initiate defect packetization on the previous sector if (1) the defect limit of register 1134 was exceeded or (2) any non-masked error was detected in a critical disk region. When this signal is asserted, the data defect counter will be synchronously cleared and the sector counter will be advanced. Additionally, the defect scan packetizer state machine will be triggered if (and only if) the above mentioned criteria for defect packetization are met.

FIG. 12 provides a logic flow diagram in accordance with an embodiment of the present invention wherein the dated portion of defect scan is processed to determine whether the defect error limit associated with individual sectors has been exceeded during the defect scan. Operations 1300 begin with the processing of the data portion of the defect scan in Step 1302. As individual symbols within individual sectors or fractional sectors are processed, a determination will be made as to whether or not a data error has been encountered at decision point 1304. Should no data error be encountered, the defect scan continues processing through the sector until completion is reached by returning to step 1302. Should the process complete an individual sector, the data defect counters may be reset. When a data error is encountered at decision point 1304, a data defect counter is incremented or decremented, depending on specific embodiments of the present invention in step 1306. For example, in the first embodiment, the data defect counter may be decremented where it is initially set at the defect limit (predetermined error threshold). Should the data defect counter reach zero, then the defect scan of the individual sector will halt and that individual sector may be masked out, in which case a data packet will be generated and processed in order to identify that sector within the primary defect list. In other examples, the defect counter may be incremented until the defect limit is reached. At decision point 1308, a decision is made as to whether or not the defect counter has reached the predetermined defect limit. If the defect limit has not been reached, the defect scan of the sector will continue by returning to Step 1302. Otherwise, in Step 1310, a data error packet will be generated for further processing in order to place the data within a primary error list.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention is described in detail, it should be understood that various changes, substitutions, and alterations can be made hereto without departing from the spirit and scope of the invention as described by the appended claims.

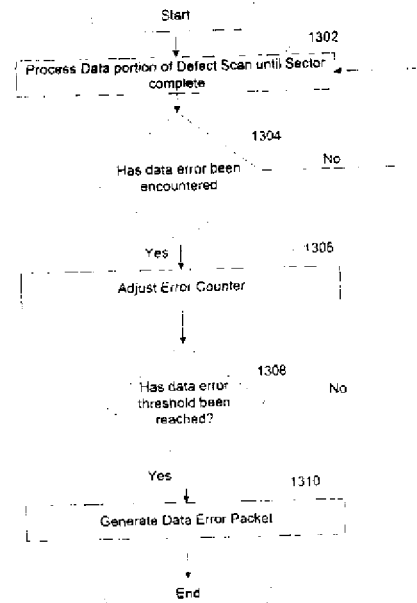

What is claimed is:

1. A method operable to mask physical sectors within magnetic media, comprising:
   writing a first pattern to a physical sector within the magnetic media;
   reading a first portion of the first pattern from the physical sector within the magnetic media;
   identifying an error in the first portion of the first pattern read from the physical sector within the magnetic media;
   adjusting an error counter when the error in the first pattern read from the physical sector is identified;
   comparing the adjusted error counter to a predetermined error threshold;
   determining a field type associated with the identified error, the predetermined error threshold being based on the field type containing the identified error;
   identifying the physical sector as defective when the adjusted error counter compares unfavorably to the predetermined error threshold without reading a remaining portion of the first pattern from the physical sector; and
   masking out the physical sector identified as defective.

2. The method of claim 1, wherein the first pattern is a 2-T pattern.

3. The method of claim 1, wherein the first pattern is written to physical sectors within magnetic media available to store and retrieve user data.

4. The method of claim 1, wherein the first pattern is written between servo wedges.

5. The method of claim 1, further comprising placing the physical sector on a primary defect list associated with the magnetic media.

6. The method of claim 1, further comprising masking out the physical sector on a primary defect list associated with the magnetic media during formatting of the magnetic media.

7. The method of claim 1, wherein the predetermined error threshold comprises a defect limit to be associated with the magnetic media.

8. The method of claim 1, wherein identifying an error in the first pattern read from the physical sector within the magnetic media comprises determining an error type associated with the error.

9. The method of claim 1, wherein reading the first pattern from the physical sector within the magnetic media further comprises:
   reading a first physical sector, until the adjusted error counter compares unfavorably to the predetermined error threshold; and
   reading a subsequent physical sector.

10. A hard disk drive, comprising:
a disk controller;
a storage media that is operable to have first pattern written thereto and read there from;
at least one read write (RW) head;
the disk controller, operably coupled to the RW head, is operable to:
   write the first pattern to and read the written first pattern from physical sectors within the storage media;
   initialize an error counter when the first pattern IS read from a first physical sector;
   identify an error in a first portion of the first pattern read from the first physical sector;
   adjust the error counter when the error in the first pattern read from the first physical sector is identified;
   compare the adjusted error counter to a predetermined error threshold;
   determine a field type associated with the identified error, the predetermined error threshold being based on the field type containing the identified error;
   identify the first physical sector as defective when the adjusted error counter compares unfavorably to the predetermined error threshold without reading a remaining portion of the first pattern from the physical sector; and
   masking out the first physical sector identified as defective.

11. The hard drive of claim 10, wherein the first pattern is a 2-T pattern.

12. The hard drive of claim 10, wherein the physical sectors are available to store and retrieve user data.

13. The hard drive of claim 10, wherein the first pattern is written between spiral sync marks.

14. The hard drive of claim 10, wherein the disk controller is further operable to place the first physical sector on a primary defect list associated with the storage media.

15. The hard drive of claim 10, further comprising masking out the first physical sector on a primary detect list associated with the storage media during formatting of the storage media.

16. The hard drive of claim 10, wherein the predetermined error threshold comprises a defect limit to be associated with the storage media.

17. The hard drive of claim 10, wherein the disk controller is further operable to determine an error type associated with the error.

18. The hard drive of claim 10, wherein the disk controller is further operable to:
   read the first physical sector, until the adjusted error counter compares unfavorably to the predetermined error threshold; and
   then read a subsequent physical sector.

19. A method operable to perform a defect scan of a storage media, comprising:
   writing a first pattern to physical sectors within the storage media;
   reading a first portion of the first pattern from a first physical sector within the storage media;
   initializing an error counter for reading the first pattern from the first physical sector;
   identifying an error in the first pattern read from the first physical sector;
   adjusting an error counter when error in the first pattern read from the first physical sector is identified;
   comparing the adjusted error counter to a predetermined error threshold;
   determining a field type associated with the identified error, the predetermined error threshold being based on the field type containing the identified error; and
   when the adjusted error counter compares unfavorably to the predetermined error threshold,
      discontinuing the reading of the first pattern within the first physical sector;
      identifying the first physical sector without reading a remaining portion of the first pattern from the physical sector;
      masking out the first physical sector identified as defective; and
      initiating the reading of the first pattern within a subsequent physical sector.

20. The method of claim 19, wherein the first pattern is a 2-T pattern.

21. The method of claim 19, wherein the first pattern is written between spiral sync.

22. The method of claim 19, further comprising placing the first physical sector on a primary defect list associated with the storage media when the adjusted error counter compares unfavorably to the predetermined error threshold.

23. The method of claim 19, further comprising masking out the first physical sector when the adjusted error counter compares unfavorably to the predetermined error threshold.

24. The method of claim 19, wherein identifying the error in the first pattern read from the first physical sector comprises determining an error type associated with the error.

* * * * *

UNITED STATES PATENT AND TRADEMARK OFFICE
CERTIFICATE OF CORRECTION

| | | |
|---|---|---|
| PATENT NO. | : 7,904,750 B2 | Page 1 of 2 |
| APPLICATION NO. | : 11/426752 | |
| DATED | : March 8, 2011 | |
| INVENTOR(S) | : Bobby Ray Southerland | |

It is certified that error appears in the above-identified patent and that said Letters Patent is hereby corrected as shown below:

Title Page

Figure 13:
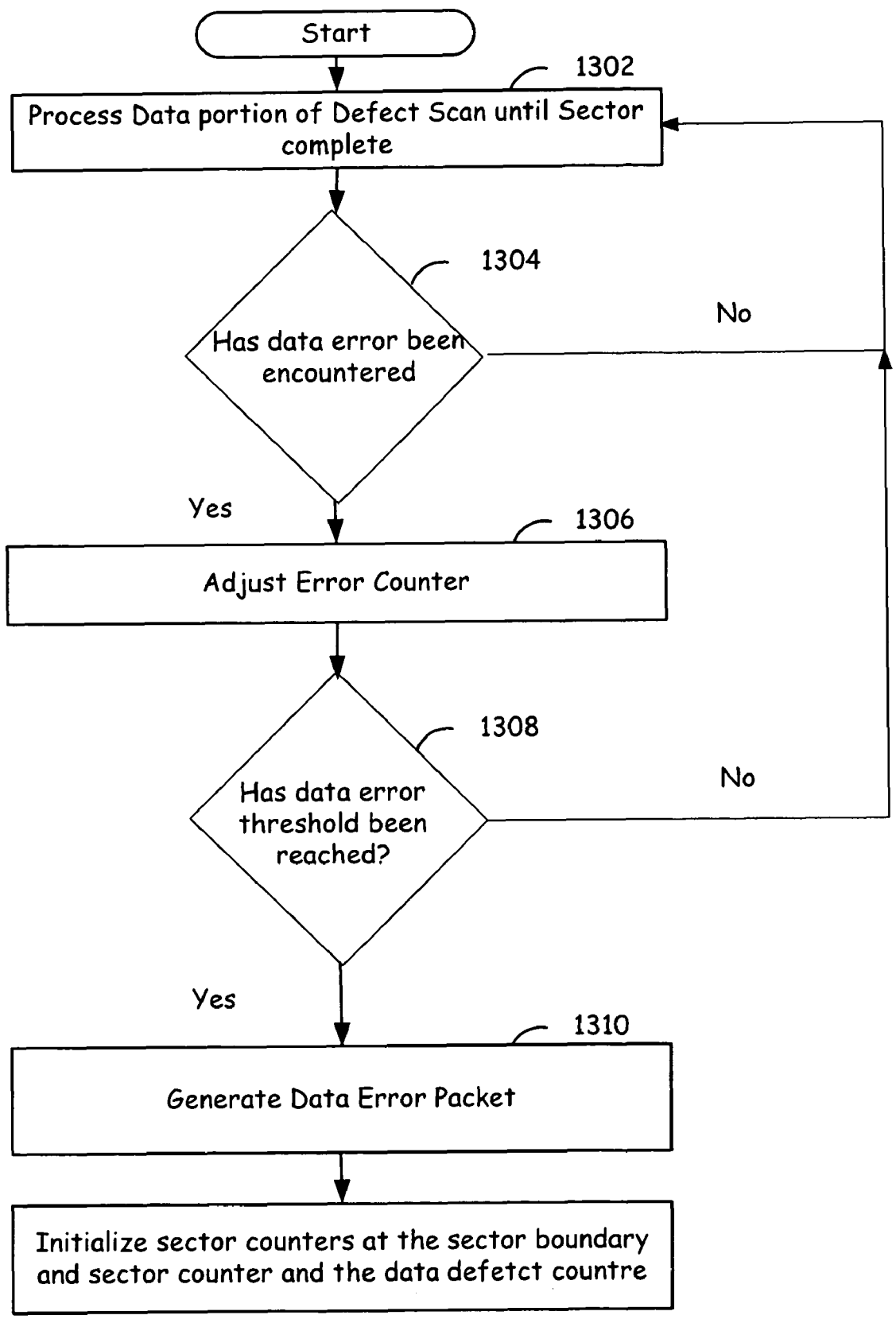
FIG. 13 provides a logic flow diagram of a defect scan in accordance with one embodiment of the present invention.

Sheet 13 of 13, Fig. 13 bottom diagram box: Replace "Initialize sector counters at the sector boundary and sector counter and the data defetct countre" with --End-- as shown on the attached page Col. 11, line 38, in claim 15: replace "detect" with --defect--

Signed and Sealed this
Thirtieth Day of October, 2012

David J. Kappos
*Director of the United States Patent and Trademark Office*

(12) United States Patent
Southerland et al.

(10) Patent No.: US 7,904,750 B2
(45) Date of Patent: Mar. 8, 2011

(54) SECTOR-ORIENTED HARDWARE DEFECT COMPRESSION BASED ON FORMAT INFORMATION

(75) Inventors: Bobby Ray Southerland, Longmont, CO (US); John P. Mead, Longmont, CO (US)

(73) Assignee: Broadcom Corporation, Irvine, CA (US)

( * ) Notice: Subject to any disclaimer, the term of this patent is extended or adjusted under 35 U.S.C. 154(b) by 512 days.

(21) Appl. No.: 11/426,752

(22) Filed: Jun. 27, 2006

(65) Prior Publication Data

US 2008/0010509 A1   Jan. 10, 2008

Related U.S. Application Data

(60) Provisional application No. 60/785,751, filed on Mar. 24, 2006.

(51) Int. Cl.
*G06F 11/00* (2006.01)

(52) U.S. Cl. .................................................. 714/8

(58) Field of Classification Search .............. 714/8
See application file for complete search history.

(56) References Cited

U.S. PATENT DOCUMENTS

| | | | | |
|---|---|---|---|---|
| 5,325,370 A | * | 6/1994 | Cleveland et al. | 714/755 |
| 5,384,786 A | * | 1/1995 | Dudley et al. | 714/784 |
| 5,422,890 A | * | 6/1995 | Klingsporn et al. | 714/723 |
| 5,537,537 A | * | 7/1996 | Fujikawa et al. | 714/30 |
| 5,563,746 A | * | 10/1996 | Bliss | 360/53 |
| 6,167,461 A | * | 12/2000 | Keats et al. | 710/5 |
| 6,275,346 B1 | * | 8/2001 | Kim et al. | 360/31 |
| 6,332,207 B1 | * | 12/2001 | Southerland et al. | 714/763 |
| 6,463,552 B1 | * | 10/2002 | Jibbe | 714/33 |
| 7,167,330 B2 | * | 1/2007 | Elliott et al. | 360/66 |
| 2001/0052093 A1 | * | 12/2001 | Oshima et al. | 714/719 |
| 2002/0035704 A1 | * | 3/2002 | Wilson | 714/6 |
| 2007/0136628 A1 | * | 6/2007 | Doi et al. | 714/718 |

OTHER PUBLICATIONS

TDB-ACC-No. NN7407495, Disclosure Title: Disc File Defect Screening System Jul. 1974, Publication-Data: IBM Technical Disclosure Bulletin, Jul. 1974, US, vol No. 17, Issue No. 2, p. 495-497.*

* cited by examiner

*Primary Examiner* — Scott T Baderman
*Assistant Examiner* — Yair Leibovich
(74) *Attorney, Agent, or Firm* — Garlick Harrison & Markison; Holly L. Rudnick

(57) ABSTRACT

A system and method identifies and masks physical sectors where the errors encountered during the defect scan exceed a predetermined level. This avoids the need to read and process all the data written to an individual sector during the initial defect scan. This method first writes a predetermined pattern such as a 2-T pattern to the magnetic media available for user data. This written pattern is then read. As the pattern is read, an error result increments or decrements a counter based on the error. The counter reaching a predetermined level signifies that there are too many errors in this physical sector. This sector may then be added to the primary defect list and masked out without reading the remaining written pattern within the sector. This will result significant time savings as physical sectors containing multiple errors are identified without process all the information written to the physical sector. The primary defect list is used during the low-level format to map logical locations to physical locations.

24 Claims, 13 Drawing Sheets